June 2, 1931. W. W. SLOANE 1,808,581
CONDUIT TERMINAL
Filed March 6, 1929
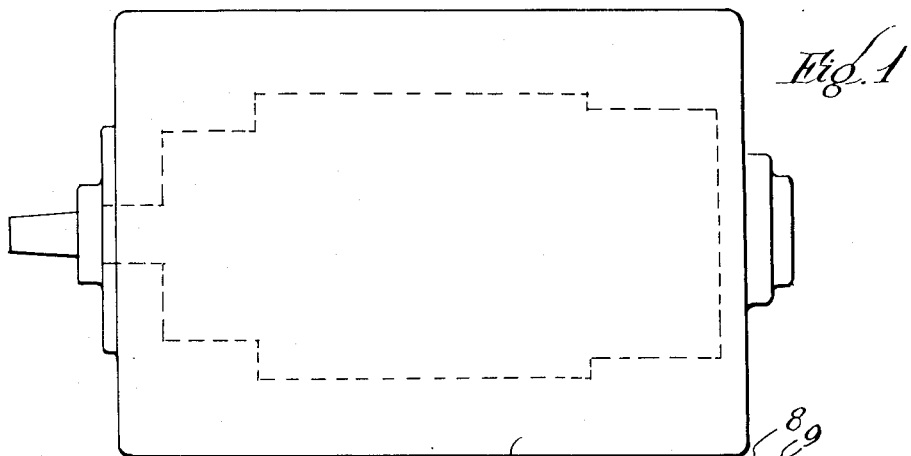
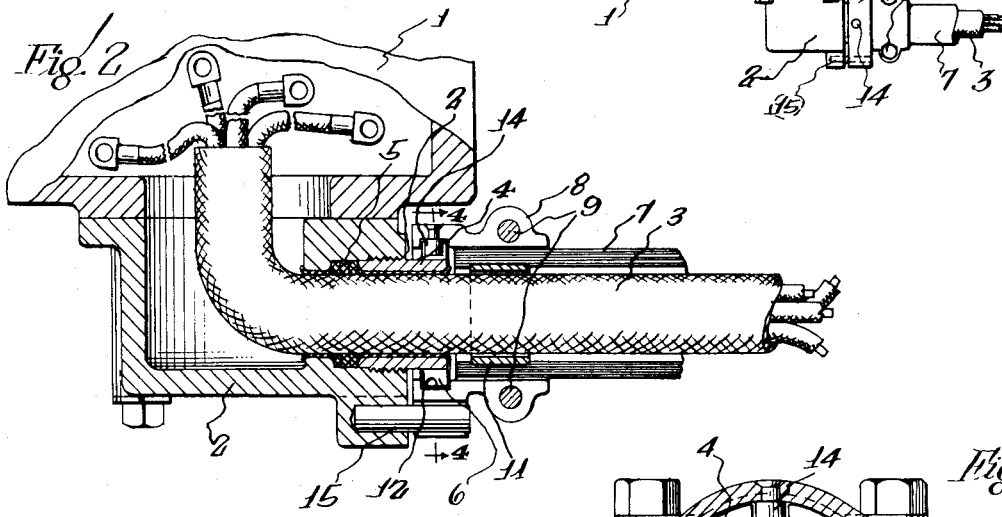
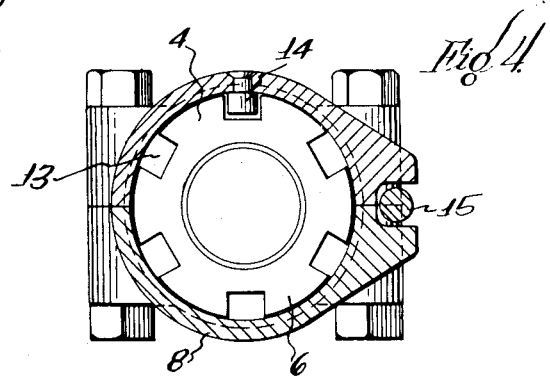
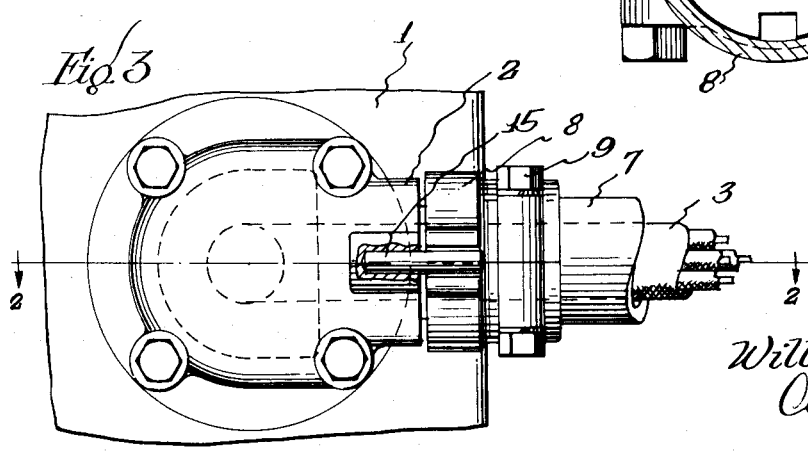
Inventor
William W. Sloane
Clarence F. Poole
Attorney Patented June 2, 1931

1,808,581

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

CONDUIT TERMINAL

Application filed March 6, 1929. Serial No. 344,646.

My invention relates particularly to electrical conductor conduit terminals and has particular relation to explosion proof electrical installations such as are used in underground mining, although not limited to this use alone.

The invention relates particularly to a conduit terminal associated with an enclosure outlet provided with a packing device including a screwthreaded packing member, and utilizes the packing member for securing the conduit terminal, the terminal preventing both turning of the conduit and of the packing member and preferably providing a continuous enclosure from the outlet, all with a view toward simplicity, ruggedness and adaptability to explosion proof installations aforementioned.

The invention will be better understood by reference to the accompanying drawings, in which:

Figure 1 is a plan view of an explosion proof enclosure equipped with my invention;

Figure 2 is a partial section on the line 2—2 of Figure 3, hereinafter described;

Figure 3 is a front elevation of the outlet portion of the enclosure; and

Figure 4 is a section on the line 4—4 of Figure 2.

Like characters of reference indicate like parts in the several views.

Referring to the drawings, 1 designates an enclosure which is provided with an outlet fitting 2 provided with an outlet aperture through which extends an insulated electrical conductor 3. See Figure 2. This outlet aperture is enlarged from the outer end thereof to provide a stuffing box into which is screwthreaded a packing member 4 to compress packing 5 within the stuffing box upon the conductor 3. The packing member 4 is provided with an exterior annular flange 6 at its outer end, as is usual.

Outwardly of the enclosure 1 and packing device the conductor 3 is enclosed within a conduit 7 such as heavy reinforced rubber tubing.

A split clamp collar comprising complemental semi-circular members 8 clamped together by bolts 9 is clamped upon the end of the conduit 7, a metal sleeve 11 on the inside of the conduit serving to strengthen the conduit at the clamped portion thereof.

The clamp collar extends outwardly beyond the end of the conduit 7, and this portion of the collar is provided with an interior annular groove 12 which is engageable over the flange 6 to axially fix the clamp collar with the packing member 4 and thus secure the end of the conduit.

The flange 6 of the packing member 4 is provided with usual peripheral angularly spaced openings 13, and a lug 14 is secured on one of the clamp members 8 and projects into the groove 12 and engages one of the openings 13 of the flange 6 to angularly fix the packing member 4 and the clamp collar.

The outlet fitting 2 is provided with a stud 15 which projects axially of the clamp collar and engages between a pair of exterior radial lugs on the clamp members 8 to angularly fix the clamp collar with the outlet fitting.

While I have shown and described one embodiment of my invention, it will be understood that the construction and arrangement of the various parts may be altered or changed without departing from the spirit and scope thereof. Furthermore I do not wish to be construed as limiting myself to the specific structure illustrated, excepting as it may be limited by the appended claims.

I claim as my invention:

1. In a device of the character described, the combination with an apertured part, of a packing device associated with the aperture of said part including a packing member screwthreaded into said aperture and provided with an exterior annular flange provided with a peripheral opening, a collar adapted to be secured on a conduit, means on said collar and engaging said flange for axially fixing said collar and packing member, means on said collar and engaging said peripheral opening for angularly fixing said collar and packing member, and an engagement between said collar and said apertured part angularly fixing the same.

2. In a device of the character described, the combination with an apertured part, of a packing device associated with the aperture of said part including a packing member screwthreaded into said aperture and provided with an exterior annular flange provided with peripheral angularly spaced openings, a collar adapted to be secured on a conduit, means on said collar and engaging said flange for axially fixing said collar and packing member, a lug on said collar engageable in one of said peripheral openings for angularly fixing said collar and packing member, and a projection on said apertured part and extending axially of said collar and engageable with a suitable formation on said collar for angularly fixing said collar and apertured part.

3. In a device of the character described, the combination with an apertured part, of a packing device associated with the aperture of said part including a packing member screwthreaded into said aperture and provided with an exterior annular flange provided with a peripheral opening, a split clamp collar for clamping upon a conduit and provided with an interior annular groove engageable on said flange to axially fix said collar and packing member, a lug on said collar engageable with said peripheral opening for angularly fixing said collar and packing member, and means for angularly fixing said collar and apertured part.

4. In a device of the character described, the combination with an apertured part, of a packing device associated with the aperture of said part including a packing member screwthreaded into said aperture and provided with an exterior annular flange provided with peripheral angularly spaced openings, a split clamp collar for clamping upon a conduit and provided with an interior annular groove engageable on said flange to axially fix said collar and packing member, a lug on said collar engageable with one of said peripheral openings to angularly fix said collar and packing member, and a projection on said apertured part and extending axially of said collar and engageable with a suitable formation on said collar for angularly fixing said collar and apertured part.

Signed at Chicago, in the county of Cook and State of Illinois, this 28th day of February, A. D. 1929.

WILLIAM W. SLOANE.